United States Patent [19]
Snyder

[11] 3,727,182
[45] Apr. 10, 1973

[54] DUAL SENSOR, ELECTRONIC MONITORING AND SIGNAL WARNING CIRCUIT FOR SPLIT MASTER BRAKE CYLINDER

[75] Inventor: George D. Snyder, Oak Park, Mich.

[73] Assignee: Chrysler Corporation, Highland Park, Mich.

[22] Filed: June 1, 1971

[21] Appl. No.: 148,676

[52] U.S. Cl. ............. 340/59, 340/244 C, 200/61.05
[51] Int. Cl. ............................................. G08b 21/00
[58] Field of Search ................. 340/59, 244 C, 249; 200/61.05, 61.2

[56] References Cited

UNITED STATES PATENTS 3,333,258  7/1967  Walker et al. ................... 340/244 C
3,343,152  9/1967  Hart ................................ 340/249

Primary Examiner—Alvin H. Waring
Attorney—Talburtt and Baldwin

[57] ABSTRACT

A dual sensor monitoring and signal warning circuit apparatus for monitoring and indicating a low brake fluid level condition in either reservoir of a split master brake cylinder. A pair of electrically conducting probes, one of which is provided for each reservoir, is connected to the input of a different one of a pair of transistors, which are serially connected in a logic form of gating circuit whose output actuates a lamp driver circuit when the fluid in either reservoir falls below the level of the sensor probe therein.

4 Claims, 1 Drawing Figure

PATENTED APR 10 1973
3,727,182
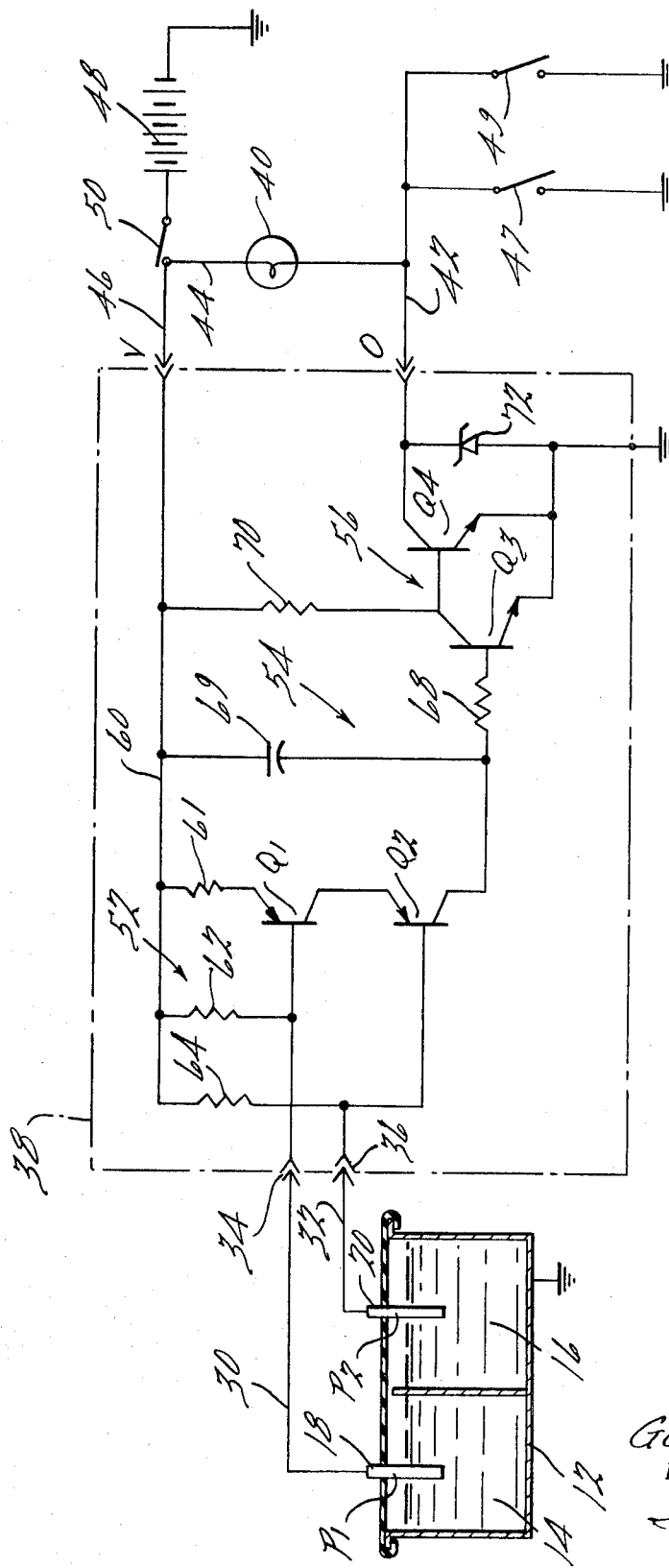
INVENTOR.
George D. Snyder
BY
Talburtt & Baldwin
ATTORNEYS.

DUAL SENSOR, ELECTRONIC MONITORING AND SIGNAL WARNING CIRCUIT FOR SPLIT MASTER BRAKE CYLINDER

BACKGROUND

This invention relates to liquid level sensors and, more particularly, to a detecting and signal warning system for sensing and indicating a lowered or depleted liquid level condition within either reservoir of a split or tandem master brake cylinder of an automotive vehicle.

The invention has for its objects to provide a simple, effective and inexpensive fluid level detector and signal warning system which is specially suited for detecting a lowered level of brake fluid within either reservoir of a split master brake cylinder; which is of a static nature characterized by the lack of any moving parts therein; and which uses a common switching circuit and warning device, shared by the sensors of both reservoirs, and a common time delay signal warning circuit to reduce the otherwise intermittent operating effect of the warning circuit due to splashing of the fluid within the reservoirs.

The above and other objects, together with the advantages, of the invention will appear more fully from the following detailed description of the preferred embodiment of the invention illustrated in the accompanying single FIGURE drawing.

Referring to the drawing, there is illustrated an electrical schematic circuit diagram of a fluid level detecting and signal warning system 10 in accordance with the present invention as applied to a split master brake cylinder 12 of an automotive vehicle. The cylinder 12 is shown as a double-chambered, electrically grounded container, which is filled with brake fluid of the type employed in the hydraulic brake systems of automotive vehicles. Each reservoir 14, 16 receives a depending plug-like, electrically conductive sensor probe 18,20 suitably supported therein at a predetermined elevation above the bottom thereof.

Each sensor probe 18,20 is connected over a different one of a pair of electrical conductors 30,32 to the input terminals 34, 36 of a four terminal, electrically grounded structure 38, constituting the detecting and switching circuit portion of the apparatus of the invention. The indicating or signal warning portion of the apparatus comprises a signal warning lamp 40, which is connected at one side by conductor 42 to the output terminal O of the structure 38. At its other side, lamp 40 is connected by conductor 44 to voltage supply conductor 46 over which B+ potential is supplied from the vehicle storage battery 48 and through the vehicle ignition switch 50 to the voltage supply terminal V of the structure 38.

Internally the structure 38 comprises a dual input form of transistor logic gate 52, a time delay circuit 54 and a lamp driver circuit 56. The gate 52 comprises a pair of PNP transistors Q1 and Q2, whose emitter-collector electrodes are connected in series from B+ bus 60 through current limiting resistor 61 connected to the emitter of Q1 as shown.

Biasing resistors 62,64 are connected from bus 60 to a different one of the base input electrodes of the transistors Q1 and Q2, which electrodes are also connected to the input terminals 34,36 of the structure 38. The output of the gate 52 is taken from the collector electrode of transistor Q2 over conductor 66 and through resistor 68 to the base input electrode of transistor Q3, which is an inverter for and together with transistor Q4 constitutes the lamp driver circuit 56. Resistor 68 cooperates with capacitor 69, which is connected between bus 60 and conductor 66 to form the time delay circuit 54.

Transistors Q3 and Q4 are NPN transistors each connected in a grounded emitter configuration with the collector electrode of Q3 and the base electrode of Q4 direct current conductively connected and supplied from B+ bus 60 through resistor 70, as shown. The collector of output transistor Q4 is connected to the output terminal O of the structure and to the ungrounded or cathode side of a Zener diode element 72, which is used for transient suppression purposes.

In operation, with both of the probes 18,20 immersed in the fluid in their respective chambers or reservoirs, current will flow out of the base electrodes of the PNP transistors Q1 and Q2 to the respective probes in contact with the electrically grounded fluid, rendering both of the transistors conducting and producing a high logic level signal at the collector output of Q2. This renders NPN transistor Q3 conductive and holds the output or switching transistor Q4 non-conductive, whereby signal warning lamp 40 will be de-energized. Gate 52 may, therefore, be characterized as a negative AND gate in that, when both of the inputs thereto are at a low logic level, the output therefrom is high.

Upon a lowered or depleted level of brake fluid in either of the reservoirs 14,16 below or out of contact with the tip of the sensor probe therein, the base current flow out of the transistor Q1 or Q2 associated with the probe of that reservoir is interrupted. This renders the affected transistor non-conductive to drop the output of the transistor gate to the opposite logic level. Therefore, transistor Q3 is turned off, and transistor Q4 is turned on, causing lamp 40 to be energized and signal a low brake fluid level condition.

The combination of the energy charge storage capacitor device 69 and resistor 68 provides a delayed turn-off of transistor Q3 after loss of contact of either of the probes with the fluid and prevents energization of the lamp 40 for a predetermined time control, say 3–30 seconds, in the event there has been a temporary loss of contact of the probe with the fluid as occasioned by sloshing or splashing of the fluid therein.

The signal warning device is preferably the pre-existing signal warning lamp associated with the vehicle parking brake actuated switch 47 and/or the differential fluid pressure operated switch 49 of which the latter is operated to close a grounding circuit for energization of the lamp 40 upon a loss of pressure of fluid in the hydraulic brake system of the vehicle.

What is claimed is:

1. In a motor vehicle, a low brake fluid sensing and indicating apparatus for sensing and indicating a lowered brake fluid level condition in either reservoir of a dual reservoir, electrically grounded master brake cylinder of the vehicle equipped with a negatively grounded source of electrical energy, said apparatus comprising the combination of:

a signal warning device;

an electrically conductive probe for each reservoir and in contact with the fluid therein at all levels above a predetermined low fluid level condition therein, said fluid electrically at the same potential in each reservoir;

a pair of resistors each connected between a different one of said probes and the positive side of said source;

a pair of direct coupled semi-conductor devices of like conductivity type each having an input electrode and a pair of output electrodes of which the output electrodes of one of said devices are connected in current controlling energizing relation with said signal warning device across said source; and another pair of semi-conductor devices of an opposite conductivity type to the first mentioned pair of semi-conductor devices and each also having an input electrode and a pair of output electrodes, said another pair of semi-conductor devices having their input electrodes each connected to a different one of the junctions between said pair of resistors and corresponding probes and responsive to a change in the potential level at either one of said junctions when the fluid drops below the predetermined low fluid level and out of contact with either one of said probes, and having their output electrodes connected in a series circuit from the positive side of said source to the input electrode of the other one of said first mentioned pair of semi-conductor devices.

2. Apparatus in accordance with claim 1 wherein the second mentioned pair of semi-conductor devices are direct current conductively coupled to the first mentioned pair of semi-conductor devices.

3. Apparatus in accordance with claim 1 further including a time delay means electrically interposed in circuit between said pairs of semi-conductor devices for delaying the transfer of said electrical signal from said another pair of semi-conductor devices to said pair of semi-conductor devices for rendering said apparatus insensitive to a temporary low fluid level due to sloshing of the brake fluid in said reservoir.

4. Apparatus in accordance with claim 1 wherein time delay means includes a resistor electrically connected between said pair and said another pair of semi-conductor devices and a capacitor electrically connected between the output of said another pair of semi-conductor devices and one side of said source of electrical energy.

* * * * *